United States Patent [19]

Adams

[11] Patent Number: 4,603,972

[45] Date of Patent: Aug. 5, 1986

[54] DISTANCE MEASUREMENT

[75] Inventor: Graham L. Adams, London, England

[73] Assignee: International Standard Electric Corporation, New York, N.Y.

[21] Appl. No.: 625,410

[22] Filed: Jun. 28, 1984

[30] Foreign Application Priority Data

Jul. 7, 1983 [GB] United Kingdom ............... 8318471

[51] Int. Cl.$^4$ .............................................. G01C 3/08
[52] U.S. Cl. .......................................... 356/4; 356/3
[58] Field of Search ................................... 356/3, 4, 5

[56] References Cited

U.S. PATENT DOCUMENTS 3,813,166  5/1974  Mary ........................................ 356/4
4,397,548  8/1983  McCormack ........................... 356/5
4,552,454 11/1985  Glaser et al. ............................ 356/5

Primary Examiner—S. C. Buczinski
Assistant Examiner—Aaron J. Lewis
Attorney, Agent, or Firm—John T. O'Halloran; Robert P. Seitter

[57] ABSTRACT

An instrument for measuring the distance of a body in relative motion away from a datum point measures the optical attenuation of an optical fibre that has an end secured to that datum and extends to the body where the remainder of the fibre is coiled. As the body moves away, so progressively more fibre is uncoiled, and the contribution of bending losses to the total loss is reduced and hence the resulting reduction in attenuation provides a measure of distance travelled.

3 Claims, 1 Drawing Figure

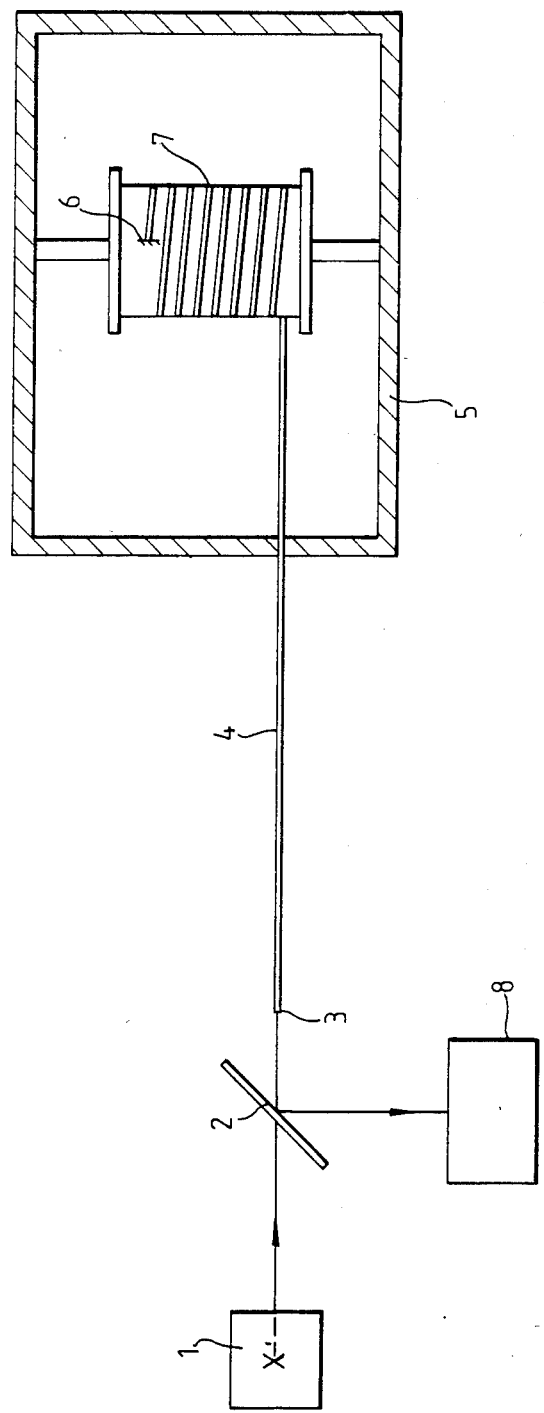

DISTANCE MEASUREMENT

BACKGROUND OF THE INVENTION

This invention relates to a method of measuring the change in distance between a datum point and a body in relative movement away from that datum point, and to an instrument for performing that method.

Provided that the medium between the datum point and the moving body is not too heavily attenuating, such measurements can in principle be made using either 'time of flight' or 'doppler' type radar measuring principles. However, for some applications adequate transparency of the intervening medium cannot be relied upon.

SUMMARY OF THE INVENTION

An object of the present invention lies in the provision of a measuring system whose functioning is independent of the attenuation of the medium lying between the datum point and the moving body.

In pursuance of this object a system of measurement is provided in which a signal is transmitted between the datum point and the moving body along an optical fibre. Such an optical fibre provides a closed system of guidance for propagating the signal, and hence its propagation is unaffected by the optical properties of the medium surrounding that fibre. Computation of the change in distance is not derived from any 'time of flight' or 'doppler' type measurements, but instead is derived from a measure of a reduction in the optical attenuation of the fibre resulting from a reduction in its bending losses as progressively more of the coil of this fibre is paid-off from that coil with increasing separation of moving body from the datum point.

BRIEF DESCRIPTION OF THE DRAWING

There follows a description of a preferred embodiment of the invention. This description refers to the accompanying drawing which is a schematic diagram of the apparatus.

DETAILED DESCRIPTION OF THE PREFERRED EMBODIMENT

Light from a source 1 is directed through a beam splitter 2 into one end 3 of an optical fibre 4. The fibre 4 extends from its end 3 to a moving body 5 where the remainder of the fibre is coiled up in a form suitable for paying-off as the body 5 moves away from the datum point represented by the fibre end 3. The other end of the fibre, the end 6 within the coiled portion 7, is provided with a high reflectivity coating so that the light launched into the fibre which propagates through to this end is reflected to propagate a second time through the length of the fibre. The reflected beam strikes the beam splitter 2 which directs a portion of the light on to a photodetector 8.

The amount of light received by the photodetector depends in part upon the optical attenuation presented by the fibre 4. This attenuation is at a minimum when the body 5 has moved so far from the datum point, the fibre end 3, that the coiled portion 7 of the fibre has been completely unwound. However, before this point is reached the attenuation is greater by virtue of the attenuation component attributable to bending losses occuring over the coiled portion 7. Therefore this component of the overall optical attenuation steadily decreases as the body 5 moves away until a limit is reached at which the coiled portion has been completely unwound. The photodetector output can therefore be calibrated in terms of distance. If desired the output can be differentiated with respect to time to provide a measure of instantaneous relative velocity.

The value of the coil radius that is suitable for any given application will depend upon the dynamic range of the photodetector, the length of path over which the distance is to be measured, and the susceptibility of the fibre in question to bending loss. This last mentioned parameter is determined primarily by numerical aperture, with low numerical aperture fibre being more susceptible than high numerical aperture fibre. Typically a coil diameter in the range 50 to 70 mm is suitable for 85/120 $\mu$m step index fibre with a numerical aperture of 0.18 for distance measurements over a range of 10 meters.

I claim:

1. A method of determining, for a body in relative movement away from a datum point, the change in distance between the body and the datum point, wherein an optical fibre, having one end secured to the datum point, extends to the body which carries the remainder of the fibre coiled for paying-off as the distance increases, and wherein a measure of the change of distance is derived from measuring the decrease in optical attenuation of the fibre resulting from a reduction of its bending losses as progressively more of the coil is paid-off.

2. An instrument for determining the change in distance between a datum point and a body in relative movement away from that datum point, wherein an optical fibre, having an end secured to the datum point, extends to the body which carries the remainder of the fibre coiled for paying-off as the distance increases, wherein means are provided at one end of the fibre to measure changes in optical attenuation of the fibre, and wherein distance changes are determined from the measure of the decrease in fibre attenuation resulting from a reduction of its bending losses as progressively more of the coil is paid-off with increasing separation.

3. An instrument as claimed in claim 2, wherein the optical attenuation measurement means measures the attenuation of a double pass through the fibre.

* * * * *